(12) United States Patent
Proietty et al.

(10) Patent No.: US 8,862,404 B2
(45) Date of Patent: Oct. 14, 2014

(54) ELECTRIC VEHICLE EMERGENCY RECHARGE ASSISTANCE

(71) Applicant: Ford Global Technologies, LLC, Dearborn, MI (US)

(72) Inventors: John Proietty, Ferndale, MI (US); Michael Edward Loftus, Northville, MI (US); Perry Robinson MacNeille, Lathrup Village, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/800,275

(22) Filed: Mar. 13, 2013

(65) Prior Publication Data

US 2014/0278104 A1 Sep. 18, 2014

(51) Int. Cl.
  *B60L 5/34* (2006.01)
  *G06F 19/00* (2011.01)
(52) U.S. Cl.
  USPC .............................. 701/537; 701/22; 320/109
(58) Field of Classification Search
  CPC ... Y02T 10/7088; Y02T 90/10; Y02T 90/167; Y02T 90/163; B06L 11/1861; H04M 3/5116
  USPC .............. 701/537, 527, 33, 22; 320/109, 101, 320/134; 705/500, 7.22, 7.12
  See application file for complete search history.

(56) References Cited

U.S. PATENT DOCUMENTS

| 2009/0082957 A1 | 3/2009 | Agassi et al. | |
| 2009/0327165 A1 | 12/2009 | Kaufman | |
| 2010/0280678 A1* | 11/2010 | Tate et al. | 700/297 |
| 2010/0291418 A1 | 11/2010 | Zhou et al. | |
| 2011/0025267 A1* | 2/2011 | Kamen et al. | 320/109 |

(Continued)

FOREIGN PATENT DOCUMENTS

| WO | 2010070642 A1 | 6/2010 |
| WO | 2011079475 A1 | 7/2011 |

OTHER PUBLICATIONS

AAA Is Now Providing Emergency Electric-Vehicle Charging Services To Stranded Drivers, Ariel Schwartz, http://www.fastcompany.com/1762382/what-happens-if-your-electric-car-runs-out-of-juice, Jun. 23, 2011 (Printed Sep. 29, 2011), pp. 1 page.

*Primary Examiner* — Tan Q Nguyen
(74) *Attorney, Agent, or Firm* — Jennifer M. Stec; Brooks Kushman P.C.

(57) ABSTRACT

A system and method for obtaining an emergency recharge in an electric vehicle is provided. The system may leverage a network of electric vehicle owners and drivers to facilitate a peer-to-peer emergency recharge of an electric vehicle unable to reach a charging station before its energy storage device is depleted. A list of potential rescuers willing to provide portable charging assistance may be generated. Out-of-range rescue vehicles may be filtered from the list. The list of potential rescuers may then be sorted based on drive time to an intercept location. Potential rescuers from the list may be sequentially contacted according to the sort order until a request for portable charging assistance is accepted. Drivers of both the soon to be stranded vehicle and the rescue vehicle may receive route guidance from navigation systems to a mutually agreeable intercept location where the peer-to-peer emergency recharge can take place.

20 Claims, 4 Drawing Sheets

(56) References Cited

U.S. PATENT DOCUMENTS

2011/0130916 A1* 6/2011 Mayer ............................ 701/33
2011/0198137 A1 8/2011 Paschoal
2011/0202476 A1 8/2011 Nagy et al.
2013/0173326 A1* 7/2013 Anglin et al. ................ 705/7.22
2013/0245870 A1* 9/2013 Mineta ........................... 701/22

* cited by examiner

ELECTRIC VEHICLE EMERGENCY RECHARGE ASSISTANCE

TECHNICAL FIELD

The present application relates to a system and method for facilitating a peer-to-peer emergency recharge for a stranded electric vehicle.

BACKGROUND

Plug-in electric vehicles, including battery electric vehicles (BEVs) and plug-in hybrid electric vehicles (PHEVs), may be connected to an external power supply for charging a vehicle battery. Such vehicles typically include a charge cord that extends from an external power supply and is physically connected to a vehicle charging port to facilitate charging of the vehicle battery. The vehicle battery provides electrical power to operate a motor, which generates wheel torque for propelling the vehicle. When the battery charge is depleted, the vehicle may no longer be mobile, particularly with respect to BEVs. Economical driving choices can help extend the vehicle's range, particularly by reducing the rate at which the vehicle expends energy stored in the battery.

Vehicles include a number of interfaces, such as gauges, indicators, and/or displays to convey information to the driver regarding the vehicle and its surroundings. With the advent of new technologies, these interfaces have become more sophisticated. For example, some vehicles include battery state of charge gauges and vehicle range indicators. Also, many electric vehicles incorporate gauges that attempt to provide the driver with charging location information such as distance to a charge point. Some gauges will indicate to the driver the vehicle range in comparison to a charge point distance. Similarly, a display may convey information that will help drivers make economical driving choices, enhance their driving experience, and safely reach their destination.

SUMMARY

One or more embodiments of the present application relate to a method for facilitating a peer-to-peer emergency recharge of an electric vehicle. The method may include receiving a request for peer-to-peer charging assistance from a traveler and receiving a list of potential rescuers to contact in sequence and request charging assistance therefrom. Upon receiving acceptance of the charging assistance request from a potential rescuer in the list, the method may further include selecting an intercept location where the traveler and rescuer can meet and transmitting the intercept location to at least the rescuer.

The method may further include filtering the list of potential rescuers based at least in part on a rescue energy value and an available energy value for each potential rescuer to obtain a filtered list of potential rescuers. Filtering the list of potential rescuers may include, for each potential rescuer, receiving a current location of a rescuer vehicle and the available energy value and calculating the rescue energy value based at least in part on the current location of the rescuer vehicle and a current location of a traveler vehicle. Filtering the list may further include removing each potential rescuer from the list of potential rescuers where the rescue energy value exceeds the available energy value.

Calculating the rescue energy value for each potential rescuer may involve calculating a first rescue energy component, a second rescue energy component and a third rescue energy component and adding the three rescue energy components together. The first rescue energy component may be obtained by calculating an amount of electrical energy required by the traveler vehicle to travel from a preliminary intercept location to a charging location. The second rescue energy component may be obtained by calculating an amount of electrical energy required by the rescue vehicle to travel from its current location to the preliminary intercept location. The third rescue energy component may be obtained by calculating an amount of electrical energy required by the rescue vehicle itself to travel from the preliminary intercept location to a charging location.

The method may further include sorting the filtered list of potential rescuers based on an intercept time to a preliminary intercept location for each potential rescuer to obtain a sorted, filtered list of potential rescuers. Moreover, the method may include transmitting the request for charging assistance to a potential rescuer from the sorted, filtered list based on sort order. The potential rescuers may be contacted in sequence according to the sort order until the acceptance of the charging assistance request is received. The preliminary intercept location for each potential rescuer may be based on location type and shortest intercept time. The location type may be a parking lot.

One or more additional embodiments of the present application relate to a vehicle system for obtaining a peer-to-peer emergency recharge. The vehicle system may include a controller configured to receive a request for peer-to-peer charging assistance from a traveler and generate a list of potential rescuers. The vehicle system may further include a transceiver in communication with the controller and configured to contact potential rescuers from the list of potential rescuers and transmit an intercept location to a rescuer upon receiving an acceptance of the request for charging assistance from the rescuer. The transceiver may be configured to contact potential rescuers by transmitting the request for peer-to-peer charging assistance to a potential rescuer selected from the list of potential rescuers.

The vehicle system may further include a user interface in communication with the controller. The user interface may be configured to notify a traveler that no charging stations are located within range of the traveler's vehicle, receive input indicative of the request for peer-to-peer charging assistance from the traveler, and display route guidance to the intercept location.

According to one or more embodiments, the controller may be further configured to receive a current location and an available energy value for a rescue vehicle associated with each rescuer from the list of potential rescuers. The controller may also filter the list of potential rescuers based at least in part on a rescue energy value and the available energy value for each potential rescuer to obtain a filtered list of potential rescuers. The controller may further sort the filtered list of potential rescuers based on an intercept time to a preliminary intercept location for each potential rescuer to obtain a sorted, filtered list of potential rescuers.

The controller may be configured to filter the list of potential rescuers by comparing the rescue energy value to the available energy value for each potential rescuer from the list of potential rescuers and eliminating each potential rescuer from the list of potential rescuers where the rescue energy value exceeds the available energy value. The rescue energy value for each potential rescuer may be calculated by summing a first rescue energy component, a second rescue energy component, and a third rescue energy component. The first rescue energy component may be obtained by calculating an amount of electrical energy required by a traveler vehicle to travel from the preliminary intercept location to a charging location. The second rescue energy component may be obtained by calculating an amount of electrical energy required by the rescue vehicle to travel from its current location to the preliminary intercept location. The third rescue energy component may be obtained by calculating an amount of electrical energy required by the rescue vehicle to travel from the preliminary intercept location to a charging location. The preliminary intercept location for each potential rescuer may be based on location type and shortest intercept time.

One or more additional embodiments of the present application may also relate to a computer system including a server. The server may be configured to receive a request for peer-to-peer charging assistance and a current location from a traveler vehicle, generate a list of potential rescuers based on a current location of associated rescuer vehicles, and transmit requests for charging assistance in sequence to potential rescuers from the list of potential rescuers. The server may be further configured to receive acceptance of the request for charging assistance from a rescuer, select an intercept location based on the current location of the traveler vehicle and the current location of the rescuer vehicle, and transmit the intercept location to the traveler vehicle and the rescuer vehicle.

The server may be further configured to filter the list of potential rescuers based at least in part on a rescue energy value and an available energy value for each potential rescuer to obtain a filtered list of potential rescuers and sort the filtered list of potential rescuers based on an intercept time to a preliminary intercept location for each potential rescuer to obtain a sorted, filtered list of potential rescuers.

The server may filter the list of potential rescuers by comparing the rescue energy value to the available energy value for each potential rescuer from the list of potential rescuers and eliminating each potential rescuer from the list of potential rescuers where the rescue energy value exceeds the available energy value. The server may calculate the rescue energy value for each potential rescuer by obtaining a first rescue energy component, a second rescue energy component and a third rescue energy component and adding the three rescue energy components together. The first rescue energy component may be obtained by calculating an amount of electrical energy required by the traveler vehicle to travel from the preliminary intercept location to a charging location. The second rescue energy component may be obtained by calculating an amount of electrical energy required by the rescue vehicle to travel from its current location to the preliminary intercept location. The third rescue energy component may be obtained by calculating an amount of electrical energy required by the rescue vehicle to travel from the preliminary intercept location.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
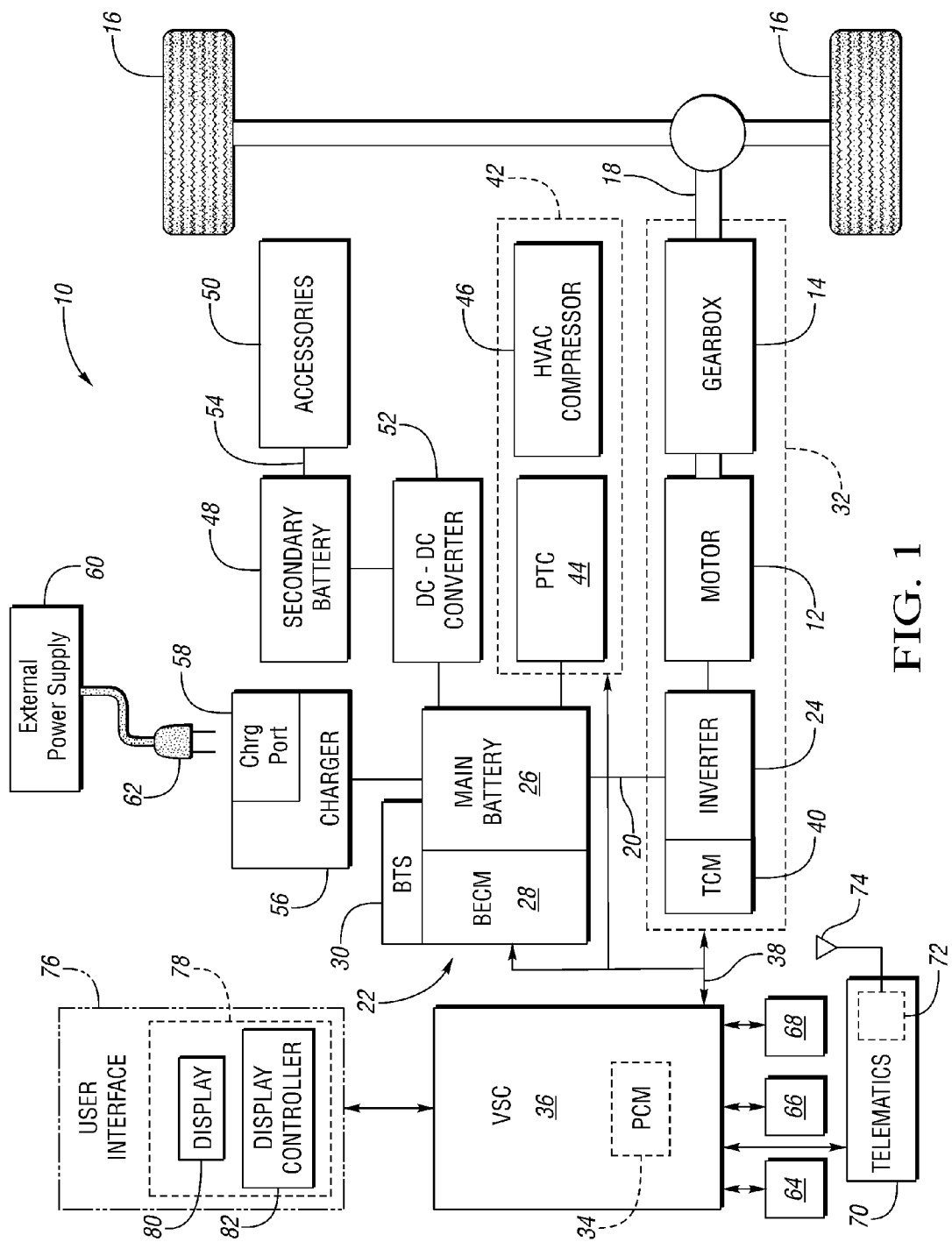
FIG. 1 is a simplified, exemplary schematic representation of a battery electric vehicle (BEV), in accordance with one or more embodiments of the present application.

Referring now to the drawings, FIG. 1 is a simplified, exemplary schematic representation of a vehicle 10. The illustrated embodiment depicts the vehicle 10 as a battery electric vehicle (BEV), which is an all-electric vehicle propelled by one or more electric motors 12 without assistance from an internal combustion engine. The motor 12 may receive electrical power and provide mechanical rotational output power. The motor 12 may be mechanically connected to a gearbox 14 for adjusting the output torque and speed of the motor 12 by a predetermined gear ratio. The gearbox 14 may be connected to a set of drive wheels 16 by an output shaft 18. Other embodiments of the vehicle 10 may include multiple motors (not shown) for propelling the vehicle. The motor 12 may also function as a generator for converting mechanical power into electrical power. A high voltage bus 20 electrically connects the motor 12 to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a battery thermal system 30, such as a fluid coolant system. The BECM 28 may act as a controller for the main battery 26 for monitoring and controlling various aspects of the battery operation. The BECM 28 may also include an electronic monitoring system that manages temperature and state of charge of each of the battery cells. Other embodiments of the vehicle 10 may utilize different types of energy storage systems, such as capacitors and fuel cells (not shown).

As shown in FIG. 1, the motor 12, the gearbox 14, and the inverter 24 may collectively be referred to as a transmission 32. To control various aspects of the electric powertrain, a powertrain controller 34 may be provided. As shown in FIG. 1, the powertrain controller 34 may be incorporated in another general vehicle controller, such as a vehicle system controller (VSC) 36. Alternatively, the powertrain controller 34 may be a dedicated controller for the electric powertrain. Although the powertrain controller 34 is shown as a single controller, it may include multiple controllers or may include multiple software components or modules embedded in a single controller. For example, the powertrain controller 34 could be a separate hardware device, or may include a separate powertrain control module (PCM), which could be software embedded within a general purpose controller, such as the VSC 36. Likewise, despite being shown as a single controller, the VSC 36 may include multiple controllers or may include multiple software components or modules embedded in a single controller to control various vehicle systems, subsystems and components. For instance, the VSC 36 may include any number of microprocessors, ASICs, ICs, memory (e.g., FLASH, ROM, RAM, EPROM and/or EEPROM) and software code to co-act with one another to perform a series of operations.

For the sake of simplicity, all monitoring, processing and control operations that may be performed by the powertrain controller 34 may be described herein as being carried out by the VSC 36, even though the powertrain controller 34 may be a separate, dedicated controller in communication with the VSC 36. To this end, the VSC 36 may communicate with other controllers (e.g., BECM 28) over a vehicle-wide network, referred to as a controller area network (CAN) 38. CAN 38 may be a hardline vehicle connection (e.g., bus) and may be implemented using any number of communication protocols.

Just as the main battery 26 includes a BECM, other devices controlled by the VSC 36 may include their own controllers, which may communicate with the VSC 36 through CAN 38. For example, the transmission 32 may include a transmission control module (TCM) 40, configured to monitor and coordinate control of specific components within the transmission 32, such as the motor 12 and/or the inverter 24. The TCM 40 may communicate with the VSC 36 over the CAN 38. The TCM 40 may include a motor controller for monitoring, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12.

Alternatively, the aforementioned controllers may be software control modules contained within the VSC 36 or other general purpose controllers residing on the vehicle 10. Some or all of these various controllers or software control modules can make up a control system in accordance with the present application. It will be appreciated, however, that various aspects of the disclosed subject matter are not limited to any particular type or configuration of the VSC 36, or to any specific control logic for managing operation of the electric powertrain or other vehicle systems.

The vehicle 10 may also include a climate control system 42 for heating and cooling various vehicle components. The climate control system 42 may include a high voltage positive temperature coefficient (PTC) electric heater 44 and a high voltage electric HVAC compressor 46. The PTC 44 may be used to heat coolant that circulates to a passenger car heater. Heat from the PTC 44 may also be circulated to the main battery 26. Both the PTC 44 and the HVAC compressor 46 may draw electrical energy directly from the main battery 26. The climate control system 42 may include a controller (not shown) for communicating with the VSC 36 over the CAN 38. The on/off status of the climate control system 42 can be communicated to the VSC 36, and can be based on, for example, the status of an operator actuated switch, or the automatic control of the climate control system 42 based on related functions such as window defrost.

In addition to the main battery 26, the vehicle 10 may include a separate, secondary battery 48, such as a typical 12-volt battery. The secondary battery 48 may be used to power various vehicle accessories, headlights, and the like (collectively referred to herein as accessories 50). A DC-to-DC converter 52 may be electrically interposed between the main battery 26 and the secondary battery 48. The DC-to-DC converter 52 may adjust, or "step down" the voltage level to allow the main battery 26 to charge the secondary battery 48. A low voltage bus 54 may electrically connect the DC-to-DC converter 52 to the secondary battery 48 and the accessories 50.

The vehicle 10 may further include an alternating current (AC) charger 56 for charging the main battery 26. The AC charger 56 may be connected to a charging port 58 for receiving AC power from an external power supply 60 located at a charging station or other charging location (e.g., a home residence). The external power supply 60 may include an adapter 62 (e.g., a plug) for connecting to the charging port 58 at the vehicle's exterior. The external power supply 60 itself may be connected to an electrical power grid. Accordingly, the AC charger 56 may include power electronics used to convert, or "rectify" the AC power received from the external power supply 60 to DC power for charging the main battery 26. The AC charger 56 may be configured to accommodate one or more conventional voltage sources from the external power supply 60 (e.g., 110 volt, 220 volt, etc.). Although described above as being located at a fixed charging location, the external power supply 60 may be any external power source accessible by a vehicle operator for connecting to, or "plugging in" the vehicle 10 via the charging port 58. Accordingly, the external power supply 60 may be a portable power source. According to one or more embodiments of the present application, the external power supply 60 may be a high voltage battery located on another electric vehicle, as will be described in greater detail below.

Also shown in FIG. 1 are simplified schematic representations of a braking system 64, an acceleration system 66, a navigation system 68, and a telematics system 70. The braking system 64 may include a brake pedal, position sensors, pressure sensors, or some combination thereof, as well as a mechanical connection to the vehicle wheels, such as the primary drive wheels 16, to effect friction braking. The braking system 64 may also be configured for regenerative braking, wherein braking energy may be captured and stored as electrical energy in the main battery 26. The acceleration system 66 may include an accelerator pedal having one or more sensors, which, like the sensors in the braking system 64, may communicate information such as throttle input to the VSC 36.

The navigation system 68 may include a navigation display, a global positioning system (GPS) unit, a navigation controller and an interface for receiving destination information or other inputs from a driver. These components may be unique to the navigation system 68 or may be shared with other vehicle systems. For instance, the GPS unit may form at least part of the telematics system 70. The navigation system 68 may also communicate distance and/or location information associated with the vehicle 10, its target destinations, charge point locations, or other relevant GPS waypoints. The navigation system 68 may display map data in connection with a current vehicle location. The navigation system 68 may also calculate travel routes and provide corresponding route guidance to a driver based on the obtained destination information, charging station locations, and other points of interest (POIs). Moreover, the travel routes may be influenced by the amount of electrical energy remaining in the main battery 26, as will be described in greater detail below.

The telematics system 70 combines telecommunications and information processing. In particular, the telematics system 70 may enable communication between the vehicle 10 and one or more communication systems such as telephone systems and satellite systems. The telematics system 70 may include a number of transceivers 72 and antennas 74 for wirelessly communicating with one or more external satellite-based sources and/or terrestrial sources by way of radio transmissions, microwave transmissions, cellular networks, or the like. In addition to a GPS, the external sources may include traffic information systems, weather information systems, or remote assistance systems, to name a few. Accordingly, the telematics system 70 may exchange signals containing vehicle location and condition data, as well as relevant weather and traffic information based on the vehicle location data.

The VSC 36 may communicate with each individual vehicle system to monitor and control vehicle operation according to programmed algorithms and control logic. In this regard, the VSC 36 may help manage the different energy sources available and the mechanical power being delivered to the wheels 16 in order to maximize the vehicle's travel range.

The VSC 36 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas 74, or manual inputs. The VSC 36 may process these input signals and others according to logic rules to monitor and control operation of the electric powertrain. Although illustrated and described in the context of the vehicle 10, which is a BEV, it is understood that embodiments of the present application may be implemented on other types of plug-in vehicles, such as plug-in hybrid electric vehicles (PHEV).

In addition to the foregoing, the vehicle 10 may include a user interface 76 to facilitate communications with a driver. The user interface 76 may communicate with the VSC 36 and may convey relevant vehicle content to a driver of the vehicle 10. According to one or more embodiments of the present application, the user interface 76 may include an information display system 78 for providing the interface between the driver and the various vehicle systems, such as the electric powertrain or telematics system 70. The information display system 78 may include an information display 80 electrically connected to a display controller 82. The display controller 82 may communicate with the powertrain controller 34, the BECM 28, the TCM 40 and other dedicated or general purpose controllers, such as the VSC 36. The display controller 82 may gather data from various vehicle systems and components such as the BECM 28, the TCM 40, the climate control system 42, vehicle accessories 50, and the like, which may be accessed via the CAN 38. Moreover, the display controller 82 may provide data to the information display 80 for conveying vehicle operation information to the driver in a meaningful manner. Signals output from the various vehicle systems and components may be processed, and display computations may be carried out, in the VSC 36, the display controller 82 or the information display 80, or some combination thereof.

Despite being shown as a separate controller, the display controller 82 may be integrated with the VSC 36 or another general or dedicated vehicle controller. Thus, as with the powertrain controller 34, all monitoring, processing and control operations that may be performed by a separate display controller may be described herein as being carried out by the VSC 36. Indeed, as used herein, any reference made to a controller in general may refer to the VSC 36, or may refer to another general or device-specific controller, such as the powertrain controller 34, the display controller 82, or any combination thereof.

The information display 80 may convey a host of information about the vehicle and its surroundings using graphical, schematic, numerical, textual and/or iconic representations or images. The display 80 may be disposed within a dashboard (not shown) of the vehicle 10, such as in an instrument panel or center console area. Moreover, the display 80 may be part of another user interface system, such as the navigation system 68, or may be part of a dedicated information display system. The display 80 may be a liquid crystal display (LCD), a plasma display, an organic light emitting display (OLED), or any other suitable display. The display 80 may include a touch screen for receiving driver input associated with selected areas of the display. The user interface 76 or display 80 may also include one or more buttons (not shown), such as hard keys or soft keys, for receiving driver input.

One or more embodiments of the present application may be implemented using the user interface 76, in particular the information display system 78. The controller 36 may regularly receive vehicle data, including operational and environmental data, from communicatively connected devices, such as those described above. Moreover, the data may be processed into one or more representations relating to the operation of the vehicle 10 that may be displayed on the information display 80. Such display representations may include information on battery state of charge (SOC), vehicle range, charge point locations, or the like. A battery SOC indicator (not shown) may convey the relative amount of electrical energy remaining in the main battery 26. BEVs have a limited range or distance that can be traveled before the main battery 26 is depleted of usable electrical energy. Accordingly, the range of a vehicle may also be referred to as its distance to empty (DTE) value.

How the vehicle 10 is driven can be an important factor in determining how long the remaining charge in the main battery 26 will last. For instance, aggressive driving behavior may deplete the main battery 26 more rapidly than relatively conservative driving behavior. To this end, the operation of the vehicle 10 may be continuously monitored and analyzed in order to determine the impact of driving behavior on the vehicle's range. The controller 36 may take into account past driving behavior, current driving behavior, or predicted future driving behavior. Other factors can influence vehicle range as well, such as weather, terrain, electrical load from accessory usage, and the like.

As mentioned previously, BEVs may have limited range; they may also have limited opportunities to recharge. As such, the user interface 76 may convey vehicle range information and target distance information to provide drivers with reassurance that they will be able to make it to their next charge point. If they are unable to reach their destination, the user interface 76 may also provide drivers plenty of warning so they can either modify their driving behavior in order to reach their target or change their target destination. For instance, the user interface 76 may identify the nearest charging station that is still within the vehicle's range. In the event a charging station is not within the vehicle's range, the driver may become stranded and require portable charging assistance.

In order to provide charging assistance, an electrical power source is needed that can supply a significant amount of power over a short time to the main battery 26 of the vehicle 10. The power source also needs to be sufficiently portable to meet up with a stranded vehicle. Once realized by the driver, a stranded vehicle may still have some amount of drive time before becoming completely dead on the road and unable to advance. Thus, the driver may still have some time available to take corrective action in order to meet up with a provider of the portable charging assistance at a convenient location.

Figure 2:
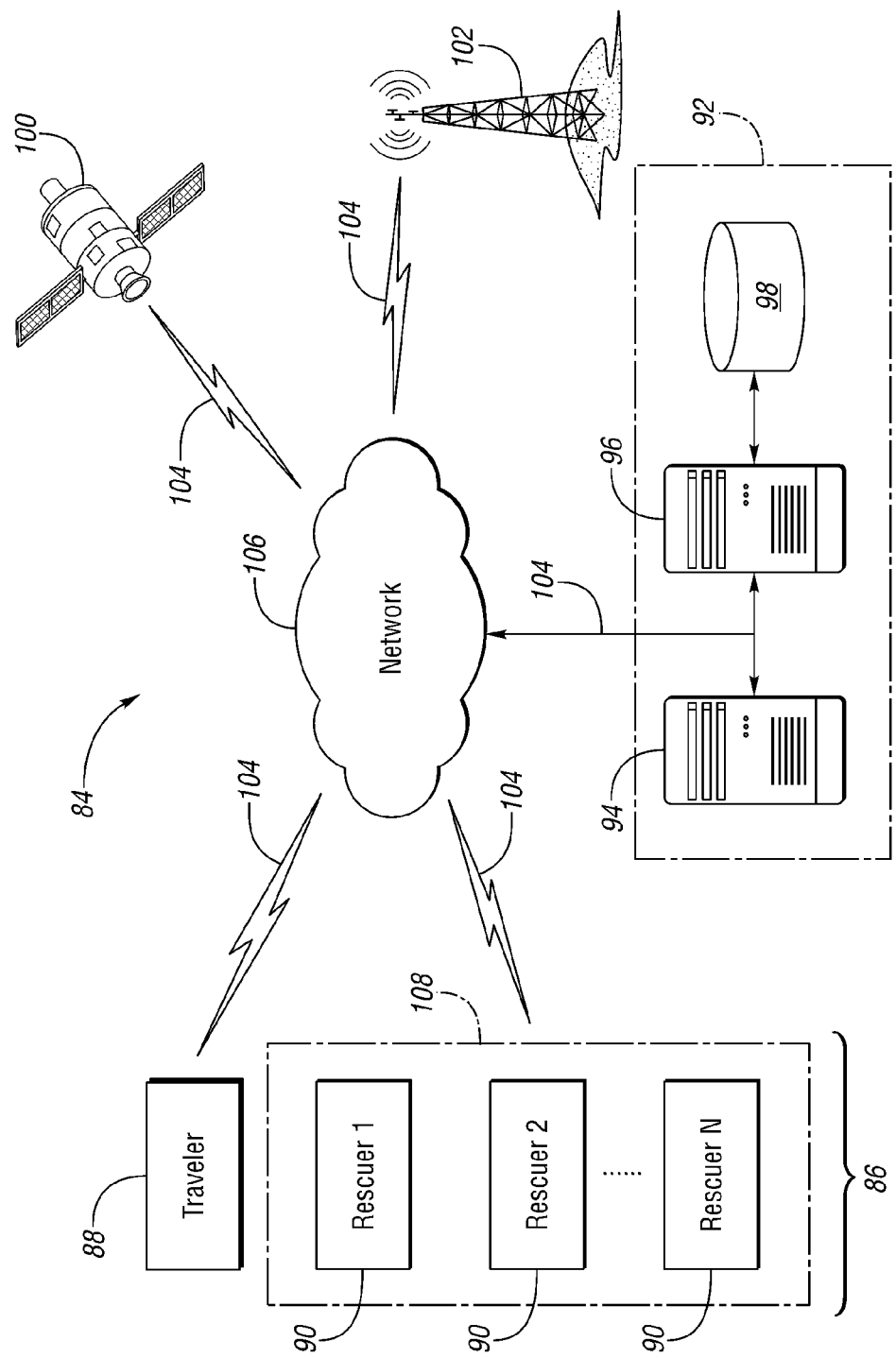
FIG. 2 is a simplified, exemplary schematic diagram of a system for providing portable charging assistance to stranded electric vehicles, in accordance with one or more embodiments of the present application.

The best device to provide portable charging assistance may be another vehicle. Accordingly, it may be helpful for the driver of a BEV in distress to discover good Samaritans that may be willing to provide aid to a stranded vehicle. FIG. 2 illustrates a simplified, exemplary schematic diagram of a system 84 for providing portable charging assistance to stranded electric vehicles, in accordance with one or more embodiments of the present application. The system 84 may connect a plurality of BEV owners together in a social network or community, including BEV owners that may be willing to provide peer-to-peer charging assistance to fellow BEV owners that become stranded or find themselves in some other form of vehicle distress. Moreover, the system 84 may facilitate the coordination of peer-to-peer charging assistance. The system 84 may be implemented as a networked client-server communications system. The system clients 86 may include a traveler vehicle 88 representing a stranded driver and plurality of rescuer vehicles 90 representing potential peer rescuers. The traveler vehicle 88 and the rescuer vehicles 90 may all be BEVs, such as vehicle 10.

The system 84 may further include a portable charging assistance component 92. As used in this application, the terms "component" and "system" may refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. A component can be localized on one computer and/or distributed between two or more computers. Likewise, as used in this application, the term "database" is intended to refer to one or more computer-related entities for the storage and access of data; and does not necessarily pertain to any manner or structure in which such data is stored.

The portable charging assistance component 92 may include one or more application servers 94 and one or more database servers 96 connected to one or more databases 98. While the application server 94 and the database server 96 are illustrated as separate computing devices, an application server and a database server may be combined in a single server machine. The system 84 may further include one or more external satellite-based sources 100 and/or terrestrial sources 102, such as a global positioning system (GPS).

The vehicles, servers, databases, and GPS may communicate with each other, directly or indirectly, via a connection to one or more communications channels 104. The communications channels 104 may be any suitable communications channels such as the Internet, cable, radio transmissions, microwave transmissions, telephone networks, or the like. Any of the devices described herein may be directly connected to each other and/or connected over one or more networks 106. As previously described, each vehicle may include a telematics system 70 enabling communication between the traveler vehicle 88 and the charging assistance component 92, the GPS and/or other vehicles 90.

One application server 94 may provide one or more functions or services to the number of client vehicles 86, such as the traveler vehicle 88. Accordingly, each application server 94 may be a high-end computing device having a large storage capacity, one or more fast microprocessors, and one or more high-speed network connections. One function or service provided by the application server 94 may be to coordinate a peer charging assistance operation for the traveler vehicle 88. According to one or more embodiments, at least one application server 94 may operate as an application in an online social networking ecosystem joining BEV owners in an online community, which can be leveraged to arrange for peer-to-peer charging assistance.

One database server 96 may provide database services to the application server 94, the number of client vehicles 86, or both. Information stored in the one or more databases 98 may be requested from the database server 96 through a "front end" running on a client vehicle 86, such as the user interface 76. On the back end, the database server 96 may handle tasks such as data analysis and storage.

Implementations of illustrative embodiments disclosed herein may be captured in programmed code stored on machine readable storage mediums, such as, but not limited to, computer disks, CDs, DVDs, hard disk drives, programmable memories, flash memories and other permanent or temporary memory sources. Execution of the programmed code may cause an executing processor to perform one or more of the methods described herein in an exemplary manner.

Figure 3:
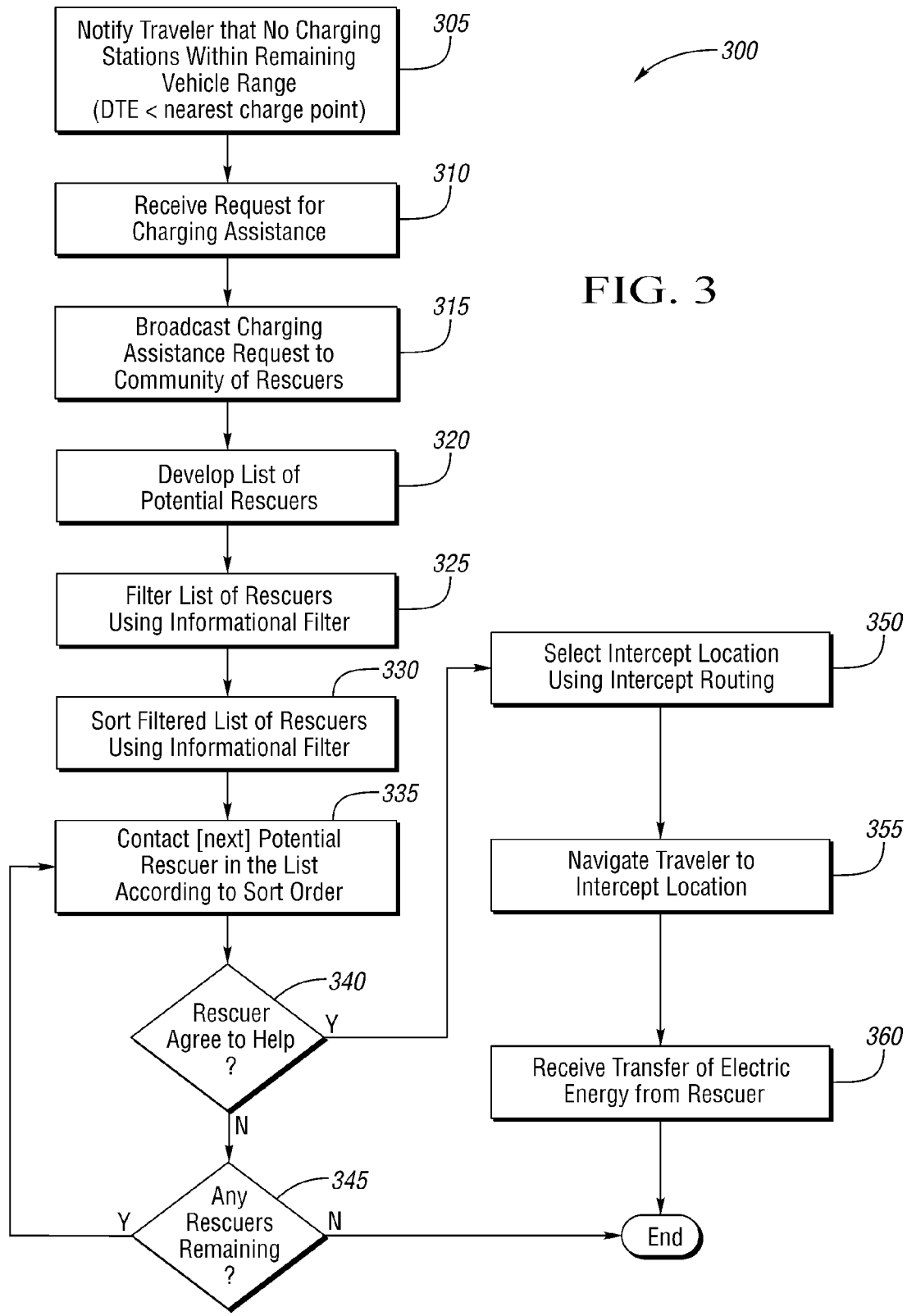
FIG. 3 is a simplified, exemplary flow diagram of a method for coordinating portable charging assistance from a peer rescuer vehicle, in accordance with one or more embodiments of the present application.

FIG. 3 is a simplified, exemplary flow diagram of a method 300 for coordinating portable charging assistance from a peer rescuer vehicle 90, in accordance with one or more embodiments of the present application. As previously discussed, a traveler vehicle 88 may become stranded when there are no charging stations within the vehicle's range (e.g., the DTE value is less than the distance to the nearest charge point). When this occurs, the controller 36 of the traveler vehicle 88 may notify the traveler that no charging stations are within the vehicle's remaining range, at step 305. The controller 36 may notify the traveler audibly and/or visually via the user interface 76. The user interface 76 may also provide the traveler with options for requesting portable charging assistance, including a request for assistance from a peer BEV owner within the social network or community of peer BEV owners. As provided at step 310, the controller 36 may receive input indicative of a traveler request for peer charging assistance from the traveler via the user interface 76. In response to the request for charging assistance, the telematics system 70 may broadcast a help signal to the community of BEV owners seeking a charge from a peer rescuer vehicle 90, at step 315. The help signal may be communicated to the charging assistance component 92, which may then relay it to potential rescuers. Alternatively, potential rescuers within range may receive the help signal directly. The help signal may include location data for the traveler vehicle 88. Potential rescuers can then respond back indicating that they are available to assist the traveler. The list of potential rescuers can then be sorted by geographic location to the traveler, amount of charge the rescue vehicle is willing to donate, type of electrified vehicle (e.g., BEV, PHEV, etc).

After the help signal is transmitted, the system may develop or otherwise generate a list of potential rescuers 108, at step 320. The list of potential rescuers 108 may be generated by the charging assistance component 92 and transmitted back to the traveler vehicle 88. The initial list of potential rescuers may include those that have previously agreed to be a volunteer for peer charging assistance. Moreover, the initial list may include those volunteers within a particular geographical region based on the traveler vehicle's location data. The list of potential rescuers may include those responding to the help signal indicating their availability to provide charging assistance. A BEV community may also develop a list of standby donors to help travelers that may be in the area, especially during special BEV events and the like when a region is expecting a heavier than usual volume of BEV traffic. At step 325, the list of potential rescuers may be filtered to obtain a filtered list of potential rescuers. The filtering step may eliminate rescuers that are out of range.

Once the filtered list of potential rescuers is obtained, the list may be further sorted to obtain a sorted, filtered list of potential rescuers, as provided at step 330. The filtering step 325 and the sorting step 330 are described in greater detail with respect to FIG. 4.

Once a filtered, sorted list of potential rescuers is obtained, the system may start contacting potential rescuers 108 in the list from beginning to end according to the sort order until a rescuer that agrees to provide charging assistance is found. At step 335, the system may attempt to contact a potential rescuer from the list by calling the potential rescuer on the traveler's behalf or initiating a telephone call for the traveler. Alternatively, the system may use other telephone or cellular services to contact a potential rescuer, such as short messenger service (SMS), instant messaging or social network messaging. At step 340, the system may determine whether a successfully contacted potential rescuer has agreed to provide portable charging assistance to the traveler. If the potential rescuer could not be reached or did not agree to help, the method may proceed to step 345. At step 345, the system may determine whether there are any potential rescuers remaining in the list yet to be contacted. If additional potential rescuers still remain, the method may return to step 335 where the next potential rescuer on the list may be contacted. If, however, the list of potential rescuers has been exhausted, the process may end without receiving portable charging assistance from a peer in the BEV owner community.

Returning to step 340, if the system receives an indication that the request for charging assistance has been accepted by the potential rescuer, the method may proceed to step 350. In certain embodiments, the agreement to provide portable charging assistance may come with a mutually agreeable price, monetary or otherwise. At step 350, an intercept location may be selected using intercept routing. The intercept routing may attempt to identify a convenient and safe intercept location, such as a lit parking area, a rest stop, a local community center, or the like. According to one or more embodiments, the system may identify and offer multiple points of interest and permit the traveler and rescuer to select a mutually agreeable intercept location among them. The system may continuously perform calculations and provide updates based on the intercept routing. Accordingly, the intercept location may be adjusted on the fly as necessary to ensure a successful meeting between the traveler vehicle 88 and the rescuer vehicle 90. To this end, the coordinates of the intercept location may be communicated to the navigation systems 68 of each vehicle. At step 355, the navigation system 68 may guide the traveler to the intercept location based on the location coordinates. The rescuer may also be guided to the intercept location in a similar manner.

When the traveler vehicle 88 and the rescuer vehicle 90 meet at the intercept location, the traveler vehicle may begin receiving electrical energy transferred from the rescue vehicle, as provided at step 360. Accordingly, the main battery 26 of the rescuer vehicle 90 may act as the external power supply 60 for the traveler vehicle 88. Electrical energy may be transferred from rescue vehicle 90 to the traveler vehicle 88 using an adapter, similar to the adapter 62. If the agreement to provide portable charging assistance came with a monetary price or some other form of payment or exchange, it can also be settled when the traveler and the rescuer meet. The peer charging assistance process may terminate once the main battery 26 of the traveler vehicle 88 has received a sufficient amount of charge to propel the vehicle to a charging location. At this point, both the traveler and the rescuer may be on their way.

Figure 4:
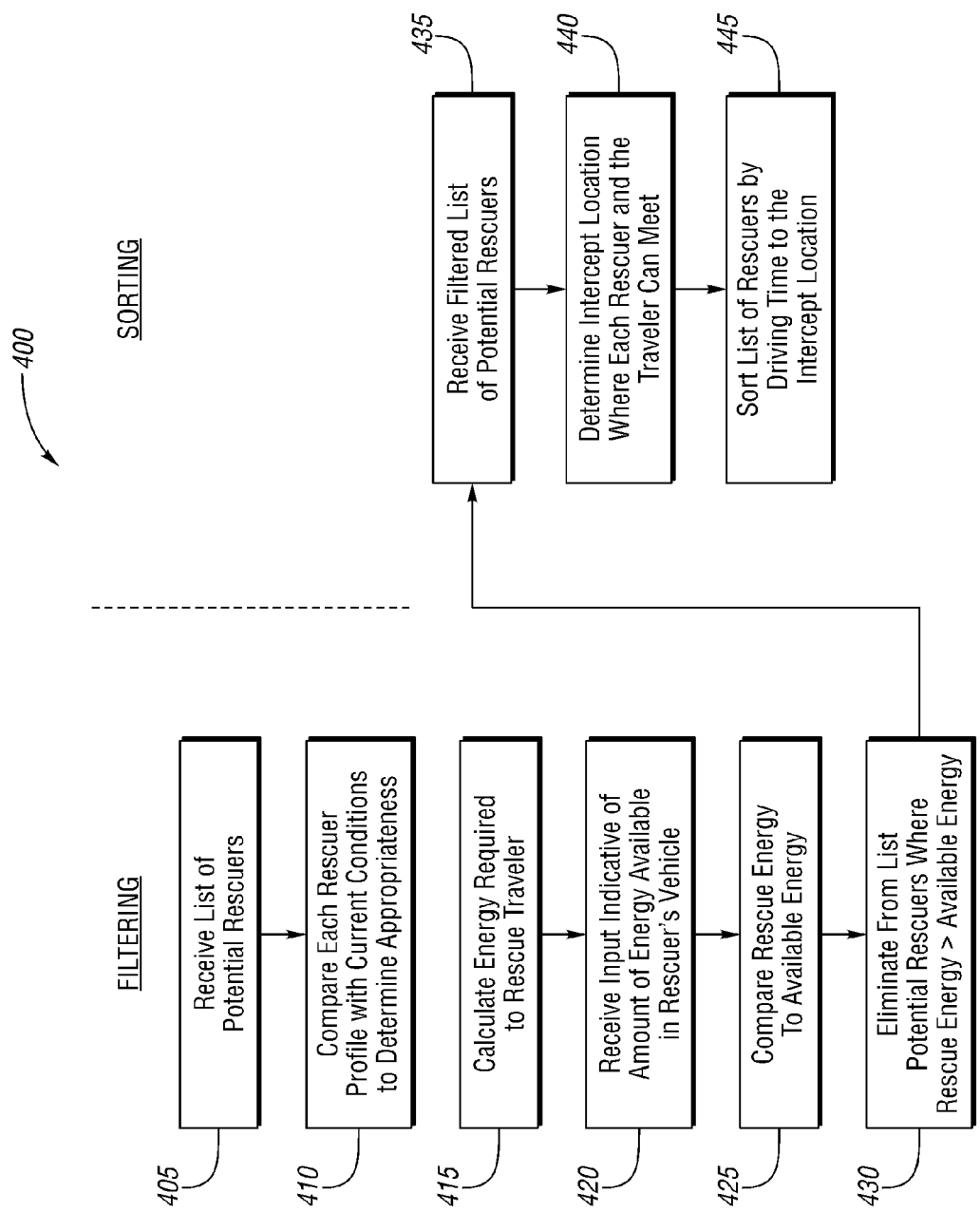
FIG. 4 is a simplified, exemplary flow diagram of a method for filtering and sorting a list of potential rescue vehicles, in accordance with one or more embodiments of the present application.

With reference now to FIG. 4, a simplified, exemplary flow diagram of a method 400 for filtering and sorting the initial list of potential rescuers 108 is illustrated. At step 405, the initial list of potential rescuers may be received. The initial list of potential rescuers may include a profile associated with each potential rescuer. Each rescuer profile may include information concerning geographic location, type of electrified vehicle (e.g., BEV, PHEV, etc.), amount of charge available to transfer, or the like. At step 410, each rescuer profile may be compared with current conditions to determine the appropriateness of each potential rescuer in the initial list as a candidate to provide portable charging assistance. With the rescue profile information, the system can determine which rescue vehicle 90 is nearest to a convenient charging location for both vehicles to guide in the intercept. Additionally, a rescue vehicle 90 may only be able to give a portion of the charge that the traveler vehicle 88 needs to reach a desired destination. Therefore, an additional rescue vehicle may be necessary to help the traveler continue to the desired destination.

At step 415, the system may calculate the amount of electrical energy required to rescue the traveler vehicle 88. This may be referred to as the rescue energy value. The rescue energy value may vary for each potential rescue vehicle 90. In general, the rescue energy value for each potential rescue vehicle 90 may include three energy components. In no particular order, the first rescue energy component may be obtained from a calculation of the amount of electrical energy required by the traveler vehicle 88 that is stranded to travel from a preliminary intercept location to another charging location, such as the nearest charging station. The main battery 26 of the rescue vehicle 90 will be depleted by at least this first rescue energy component when delivering charge to the stranded traveler vehicle 88. The second rescue energy component may be obtained from a calculation of the amount of electrical energy required by the rescue vehicle 90 to travel from its current location to the preliminary intercept location so that it may provide the traveler vehicle 88 with portable charging assistance. The third rescue energy component may be obtained from a calculation of the amount of electrical energy required by the rescue vehicle 90 itself to travel from the preliminary intercept location to another charging location. It doesn't do any good if, upon rescuing the traveler vehicle 88, the rescue vehicle 90 also needs rescuing. The rescue energy components may be calculated based at least in part on the location data of either the traveler vehicle 88 or rescue vehicle 90 and the preliminary intercept location and surrounding charging locations. Once the three rescue energy components are calculated, they may be added together to obtain the overall rescue energy value for each corresponding potential rescue vehicle 90.

At step 420, the system may receive input indicative of the amount of energy available in the main battery 26 of each rescue vehicle 90, referred to as its available energy value. The available energy value may be communicated from potential rescue vehicles 90 to the charging assistance component. In order to provide portable charging assistance, the rescue energy value associated with a rescue vehicle should be less than the rescue vehicle's available energy value. Accordingly, for each potential rescue vehicle 90, the rescue energy value may be compared to available energy value, at step 425. Potential rescue vehicles 90 in which the rescue energy value exceeds the available energy value may be eliminated from the list of potential rescue vehicles during the filtering process, as provided at step 430.

Stated differently, each potential rescue vehicle 90 may compute and advertise a range contour. The system may then identify potential rescue vehicles 90 whose range contours intersect the range contour of the traveler vehicle 88 requiring charging assistance. The range contours may be the maximum vehicle range given the vehicle location and the position of a suitable charging station. Moreover, the traveler vehicle 88 may multicast its power requirement to the list of potential rescue vehicles 90 and the range contour for each rescue vehicle may be recomputed by subtracting the power needed to recharge the traveler vehicle 88 in need of assistance. The list of potential rescuers may then be reduced to the vehicles whose range contours still intersect with the range contour of the traveler vehicle 88. Accordingly, the filtered list of potential rescuers may contain the rescue vehicles 90 with a real potential of rescuing the traveler vehicle 88 and then safely getting to a charging station.

At step 435, the sorting process may commence upon receiving the filtered list of potential rescuers. At step 440, the system may identify a potential intercept location where each potential rescuer and the traveler can meet. The intercept location may vary for each potential rescuer and may be updated from the preliminary intercept location. The system may use intercept routing, as previously described, to determine an initial intercept location for each potential rescue vehicle 90 that is within the remaining driving range of the traveler vehicle 88 in need of charging assistance. The intercept location may be a parking lot or similar location that represents the shortest time to intercept. Once the intercept locations are calculated or otherwise determined, the filtered list of potential rescuers may be sorted by driving time to the intercept location to obtain a sorted, filtered list of potential rescuers, as provided at step 445. The sort order may go from the shortest drive time to the longest drive time. The drive time to the intercept location associated with each potential rescuer may be the longer of the two drive times between: (a) the traveler vehicle 88 and the intercept location; and (b) the rescuer vehicle 90 and the intercept location. Sorting the list of potential rescuers 108 in this manner will give priority to contacting potential rescuers having shorter drive times. Thus, the overall rescue time may be optimally minimized.

One or more of the steps described above in connection with FIGS. 3 and 4 may be carried out by the charging assistance component 92 and communicated back to a client vehicle 86. Likewise, one or more of the above steps may be carried out at the client vehicle level, based on information relayed from the charging assistance component 92 and/or GPS. For instance, through the telematics system 70, the VSC 36 may receive the list of potential rescuers from the charging assistance component 92, which may be communicatively connected to the plurality of rescue vehicles 90. The list of potential rescuers may also include data indicative of the location and available energy value for each corresponding rescue vehicle 90. Moreover, the controller 36, or navigation system 68 in communication with the controller 36, may determine intercept locations, filter and sort the list of potential rescuers, and direct the telematics system 70 to contact potential rescuers according to the sort order.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    receiving a request for peer-to-peer charging assistance from a traveler;
    receiving a list of potential rescuers to contact in sequence and request charging assistance therefrom;
    upon receiving acceptance of the charging assistance request from a potential rescuer in the list, selecting an intercept location where the traveler and rescuer can meet; and
    transmitting the intercept location to at least the rescuer.

2. The method of claim 1, further comprising:
    filtering the list of potential rescuers based at least in part on a rescue energy value and an available energy value for each potential rescuer to obtain a filtered list of potential rescuers.

3. The method of claim 2, wherein the step of filtering the list of potential rescuers comprises:
    for each potential rescuer, receiving a current location of a rescuer vehicle and the available energy value;
    for each potential rescuer, calculating the rescue energy value based at least in part on the current location of the rescuer vehicle and a current location of a traveler vehicle; and
    removing each potential rescuer from the list of potential rescuers where the rescue energy value exceeds the available energy value.

4. The method of claim 3, wherein the step of calculating the rescue energy value for each potential rescuer comprises:
    calculating an amount of electrical energy required by the traveler vehicle to travel from a preliminary intercept location to a charging location to obtain a first rescue energy component;
    calculating an amount of electrical energy required by the rescue vehicle to travel from its current location to the preliminary intercept location to obtain a second rescue energy component;
    calculating an amount of electrical energy required by the rescue vehicle itself to travel from the preliminary intercept location to a charging location to obtain a third rescue energy component; and
    adding the first rescue energy component, the second rescue energy component and the third rescue energy component together to obtain the rescue energy value.

5. The method of claim 2, further comprising:
    sorting the filtered list of potential rescuers based on an intercept time to a preliminary intercept location for each potential rescuer to obtain a sorted, filtered list of potential rescuers.

6. The method of claim 5, further comprising:
    transmitting the request for charging assistance to a potential rescuer from the sorted, filtered list based on sort order.

7. The method of claim 5, wherein the potential rescuers are contacted in sequence according to the sort order until the acceptance of the charging assistance request is received.

8. The method of claim 5, wherein the preliminary intercept location for each potential rescuer is based on location type and shortest intercept time.

9. The method of claim 8, wherein the location type is a parking lot, rest stop, or local community center.

10. A vehicle system comprising:
a controller configured to:
  receive a request for peer-to-peer charging assistance from a traveler;
  generate a list of potential rescuers; and
a transceiver in communication with the controller and configured to:
  contact potential rescuers from the list of potential rescuers; and
  transmit an intercept location to a rescuer upon receiving an acceptance of the request for charging assistance from the rescuer.

11. The vehicle system of claim 10, wherein the transceiver is configured to contact potential rescuers by transmitting the request for peer-to-peer charging assistance to a potential rescuer selected from the list of potential rescuers.

12. The vehicle system of claim 10, further comprising a user interface in communication with the controller and configured to:
  notify a traveler that no charging stations are located within range of the traveler's vehicle;
  receive input indicative of the request for peer-to-peer charging assistance from the traveler; and
  display route guidance to the intercept location.

13. The vehicle system of claim 10, wherein the controller is further configured to:
  receive a current location and an available energy value for a rescue vehicle associated with each rescuer from the list of potential rescuers;
  filter the list of potential rescuers based at least in part on a rescue energy value and the available energy value for each potential rescuer to obtain a filtered list of potential rescuers; and
  sort the filtered list of potential rescuers based on an intercept time to a preliminary intercept location for each potential rescuer to obtain a sorted, filtered list of potential rescuers.

14. The vehicle system of claim 13, wherein the controller is configured to filter the list of potential rescuers by:
  comparing the rescue energy value to the available energy value for each potential rescuer from the list of potential rescuers; and
  eliminating each potential rescuer from the list of potential rescuers where the rescue energy value exceeds the available energy value.

15. The vehicle system of claim 14, wherein the controller is configured to calculate the rescue energy value for each potential rescuer by:
  calculating an amount of electrical energy required by a traveler vehicle to travel from the preliminary intercept location to a charging location to obtain a first rescue energy component;
  calculating an amount of electrical energy required by the rescue vehicle to travel from its current location to the preliminary intercept location to obtain a second rescue energy component;
  calculating an amount of electrical energy required by the rescue vehicle to travel from the preliminary intercept location to a charging location to obtain a third rescue energy component; and
  adding the first rescue energy component, the second rescue energy component and the third rescue energy component together to obtain the rescue energy value.

16. The vehicle system of claim 13, wherein the preliminary intercept location for each potential rescuer is based on location type and shortest intercept time.

17. A computer system comprising:
a server configured to:
  receive a request for peer-to-peer charging assistance and a current location from a traveler vehicle;
  generate a list of potential rescuers based on a current location of associated rescuer vehicles;
  transmit requests for charging assistance in sequence to potential rescuers from the list of potential rescuers;
  receive acceptance of the request for charging assistance from a rescuer;
  select an intercept location based on the current location of the traveler vehicle and the current location of the rescuer vehicle; and
  transmit the intercept location to the traveler vehicle and the rescuer vehicle.

18. The computer system of claim 17, wherein the server is further configured to:
  filter the list of potential rescuers based at least in part on a rescue energy value and an available energy value for each potential rescuer to obtain a filtered list of potential rescuers; and
  sort the filtered list of potential rescuers based on an intercept time to a preliminary intercept location for each potential rescuer to obtain a sorted, filtered list of potential rescuers.

19. The computer system of claim 18, wherein the server is configured to filter the list of potential rescuers by:
  comparing the rescue energy value to the available energy value for each potential rescuer from the list of potential rescuers; and
  eliminating each potential rescuer from the list of potential rescuers where the rescue energy value exceeds the available energy value.

20. The computer system of claim 19, wherein the server is configured to calculate the rescue energy value for each potential rescuer by:
  calculating an amount of electrical energy required by the traveler vehicle to travel from the preliminary intercept location to a charging location to obtain a first rescue energy component;
  calculating an amount of electrical energy required by the rescue vehicle to travel from its current location to the preliminary intercept location to obtain a second rescue energy component;
  calculating an amount of electrical energy required by the rescue vehicle to travel from the preliminary intercept location to a charging location to obtain a third rescue energy component; and
  adding the first rescue energy component, the second rescue energy component and the third rescue energy component together to obtain the rescue energy value.

* * * * *